US008893951B2

(12) United States Patent
dos Santos et al.

(10) Patent No.: US 8,893,951 B2
(45) Date of Patent: Nov. 25, 2014

(54) APPARATUS FOR FRICTION STIR WELDING

(75) Inventors: Jorge F. dos Santos, Tespe (DE); Jakob Hilgert, Hamburg (DE)

(73) Assignee: Helmholtz-Zentrum Geesthacht Zentrum fur Material-und Kustenforschung GmbH (DE)

( * ) Notice: Subject to any disclaimer, the term of this patent is extended or adjusted under 35 U.S.C. 154(b) by 0 days.

(21) Appl. No.: 13/437,732

(22) Filed: Apr. 2, 2012

(65) Prior Publication Data
US 2012/0248174 A1 Oct. 4, 2012

(30) Foreign Application Priority Data
Apr. 1, 2011 (DE) .......................... 10 2011 015 831

(51) Int. Cl.
*B23K 20/12* (2006.01)

(52) U.S. Cl.
CPC ............. *B23K 20/126* (2013.01); *B23K 20/122* (2013.01)
USPC ........................................ 228/2.1; 228/112.1

(58) Field of Classification Search
USPC ................................................. 228/2.1, 112.1
See application file for complete search history.

(56) References Cited

U.S. PATENT DOCUMENTS

| | | | |
|---|---|---|---|
| 5,262,123 A | 11/1993 | Thomas et al. | |
| 6,237,835 B1 * | 5/2001 | Litwinski et al. | 228/112.1 |
| 6,722,556 B2 * | 4/2004 | Schilling et al. | 228/112.1 |
| 6,758,382 B1 | 7/2004 | Carter | |
| 6,799,708 B2 * | 10/2004 | von Strombeck et al. | 228/2.1 |
| 7,163,136 B2 * | 1/2007 | Hempstead | 228/2.1 |
| 7,234,625 B2 | 6/2007 | Loitz et al. | |
| 7,686,202 B1 * | 3/2010 | Carter et al. | 228/2.1 |
| 2003/0152466 A1 | 8/2003 | Sung | |
| 2003/0201307 A1 * | 10/2003 | Waldron et al. | 228/112.1 |
| 2009/0120995 A1 * | 5/2009 | Hallinan et al. | 228/2.3 |
| 2009/0123778 A1 * | 5/2009 | Russell et al. | 428/661 |
| 2009/0255321 A1 | 10/2009 | Sylva et al. | |

FOREIGN PATENT DOCUMENTS

| | | |
|---|---|---|
| DE | 19957136 C1 | 2/2001 |
| DE | 102004028560 B3 | 3/2005 |
| DE | 102011015831 B3 | 7/2012 |
| EP | 1738856 A1 | 3/2007 |
| JP | 2008296285 | 12/2008 |
| WO | 2006055530 A1 | 5/2006 |
| WO | 2006081819 A1 | 8/2006 |
| WO | 2009056759 A2 | 7/2009 |

OTHER PUBLICATIONS

European Search Report from European Application No. EP 12160111(dated Jul. 12, 2012).

* cited by examiner

*Primary Examiner* — Devang R Patel
(74) *Attorney, Agent, or Firm* — Hovey Williams LLP

(57) ABSTRACT

An apparatus for friction stir welding includes a rotatably drivable pin having a drive end and a free end; a cylindrical engaging portion provided between the drive end and the free end and including a circumferential surface for engagement with one or more workpieces; and first and second shoulder elements arranged concentrically around the pin and positioned on respective sides of the of the engaging portion adjacent the drive end and the free end, respectively. The first and second shoulder elements include respective first and second bearing surfaces facing the engaging portion and extending perpendicularly to the axis of rotation. The mechanical and thermal loading of the pin and the thermal loading of the workpieces are reduced by merit of the second shoulder element being connected to the pin so as to be freely rotatable about the axis of rotation.

7 Claims, 2 Drawing Sheets

APPARATUS FOR FRICTION STIR WELDING

RELATED APPLICATION

Figure 1:
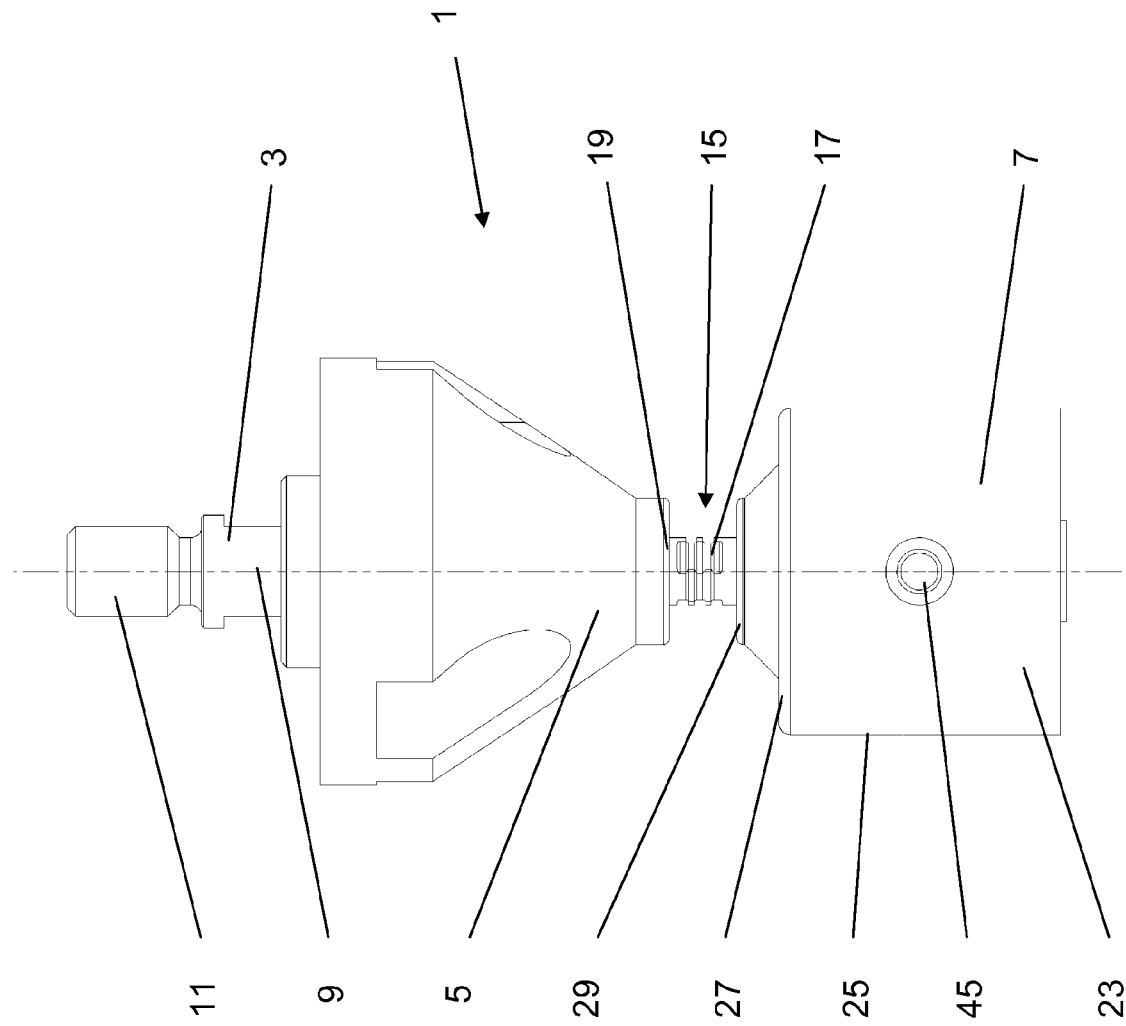

The present application claims the benefit of and priority from German Patent Application No. DE 10 2011 015 831.6, filed Apr. 1, 2011, the entire disclosure of which is hereby incorporated by reference herein.

BACKGROUND OF THE INVENTION

1. Field of the Invention

The present invention relates to an apparatus for friction stir welding with a pin, which can be driven in a rotating manner about an axis of rotation and has a drive end and a free end, wherein between the drive end and the free end there is provided a cylindrical engaging portion, which extends axially in the direction of the axis of rotation and the circumferential surface of which is intended for engagement with one or more workpieces, with a first shoulder element, which is arranged on the side of the engaging portion that is facing the drive end concentrically around the pin with respect to the axis of rotation and which has a first bearing surface, facing the engaging portion and extending perpendicularly to the axis of rotation, and with a second shoulder element, which is arranged on the side of the engaging portion that is facing the free end concentrically around the pin with respect to the axis of rotation and which has a second bearing surface, facing the engaging portion and extending perpendicularly to the axis of rotation, wherein the second bearing surface extends right up to the engaging portion and wherein the first shoulder element is intended for bearing against the first surface and the second shoulder element is intended for bearing against the second surface, opposite from the first, of one or more workpieces.

2. Discussion of the Prior Art

The principle of friction welding involves the material of one or more workpieces being initially plasticized by friction between the workpiece and a further workpiece or a tool and then solidifying again. In friction stir welding, the two workpieces to be joined, which are generally metallic, are initially placed against one another. This may mean, for example, that two metal plates or sheets are placed surface against surface (lap joint) or else positioned next to one another such that the narrow side faces lie against one another (butt joint). After that, a friction stir welding tool in the region of the contact surface is introduced into the material of at least one of the two workpieces—for example via a bore or from the edge.

The friction stirring process is brought about by the rotation of the tool, the tool rubbing against at least one workpiece and plasticizing the material of at least one of the two workpieces. The friction stir welding tool may optionally be moved at the same time along the interface of the two workpieces. The plasticized material at the interface of the two workpieces subsequently cools down and forms the weld that keeps the two workpieces together.

Numerous apparatuses for friction stir welding are already known from the prior art, such as for example WO 2006/055530. Common to all of these apparatuses is a substantially cylindrical or conical pin with an engaging portion for engaging with at least one workpiece and with a shoulder element for bearing against the surface of the at least one workpiece. The pin and the shoulder element are driven in a rotating manner, the pin penetrating for example between two workpieces that are to be joined and have been placed one against the other so far into the workpieces that the shoulder element bears against the surface of the workpieces.

The friction of the pin and the shoulder element against the workpieces has the effect that the material in the adjacent region of the workpieces plasticizes. With a simultaneous forward movement of the apparatus along the contact surface of the two workpieces, material plasticized by the rotating pin is transported behind the pin, as seen in the direction of movement thereof, where it joins other plasticized material of the two workpieces and forms a weld.

To be able to support the friction stir welding tool on both surfaces and to align the workpieces with one another and press them against one another, an apparatus for friction stir welding with a first and a second shoulder element—known as a bobbin tool—may be used, the first and second shoulder elements bearing against opposing surfaces of the workpiece or workpieces. Such an apparatus is known, for example, from JP 2008/296285 or from EP 1 738 856 B1.

However, the problem with the apparatus for friction stir welding of the bobbin configuration is that, in order to transfer a torque to both shoulder elements and at the same time rub against the region to be plasticized of the at least one workpiece, the pin must absorb very high mechanical and thermal loads. In order not to destroy the apparatus, the achievable speed in the forward movement of the pin is consequently limited by the workpiece, as a result of which the duration of the overall welding process is also increased. However, the limited speed, necessary from mechanical aspects, in the forward movement of the pin leads to excessive process temperatures in the plasticized region of the workpiece and in the region of the pin, which on the one hand may have adverse effects on the quality of the welded joint and on the other hand may damage the pin itself.

Furthermore, when a bobbin tool is used, the process speeds are well below the process speeds of conventional friction stir welding tools. For these reasons, the friction stir welding process using bobbin tools has so far only been of secondary importance.

SUMMARY

On the basis of the prior art, it is therefore the object of the present invention to provide an apparatus for friction stir welding with which the mechanical and thermal loading of the pin and the thermal loading of the workpieces are reduced.

This object is achieved by the second shoulder element being connected to the pin freely rotatably about the axis of rotation. In this way, the pin does not transfer any torque to the second shoulder element, but rotates freely in relation to it. The second shoulder element consequently does not perform any rotational movement with respect to the surface of the at least one workpiece, for which reason there is also no friction resulting from the rotational movement, friction which in turn would be responsible for additional heating up of the second shoulder element and the at least one workpiece. Since the second bearing surface extends right up to the engaging portion of the pin, it is merely the engaging portion that generates frictional heat during the rotation thereof. The second shoulder element does not contribute to this.

Mechanical and thermal loading of the pin is consequently reduced. The thermal loading of the workpiece or the workpieces is also reduced. A lower maximum workpiece temperature is in turn reflected in higher quality of the welded joint. Furthermore, with lower thermal and mechanical loading of the pin, a higher welding speed can be set, i.e. the pin can be moved forward through the material at higher speed. In this way, on the one hand the temperature of the pin and the workpiece can be further reduced. On the other hand, a shorter duration of the process, and consequently a more efficient welding process, are possible.

To sum up, it can be stated that, with the pin according to the invention, rotating freely with respect to the second shoulder element, damage to the pin is counteracted, higher quality of the welded joint is achieved and a faster, more efficient welding process is made possible.

In a preferred embodiment, the pin is connected to the second shoulder element in an axially adjustable manner. In this way, the distance of the second shoulder element from the first shoulder element, and consequently the size of the engaging portion, can be changed, whereby the apparatus can be adapted to different workpiece dimensions. Furthermore, with an axially adjustable second shoulder element, which for example undergoes a prestressing force, pressure can be exerted on the workpiece or the workpieces in order to achieve a better supporting effect.

In a further preferred embodiment, the second shoulder element has a second annular intermediate piece of ceramic material, provided in the second bearing surface, the second intermediate piece surrounding the engaging portion. The second intermediate piece is arranged concentrically around the pin with respect to the axis of rotation, i.e. between the engaging portion of the pin and the second shoulder element.

The second annular intermediate piece serves initially for the thermal isolation of the pin and the second shoulder element, direct contact between the pin and the second shoulder element being prevented. This effect is enhanced by the use of a ceramic material, which has a very low thermal conductivity.

Such an intermediate piece additionally serves as a sliding bearing for the pin in the second shoulder element or as a sliding bearing for the second shoulder element on the pin. The ceramic material of the second intermediate piece not only has high temperature resistance but also high strength and can therefore absorb the high temperatures of the pin and the high bearing forces and moments of the pin without being damaged. Furthermore, ceramic sliding bearings can be produced with a sufficiently smooth surface to permit low-friction mounting of the pin both with respect to rotation of the pin and with respect to an axial relative movement between the pin and the second shoulder element.

In yet another preferred embodiment, the second shoulder element is formed as a sleeve with a bottom surface extending radially to the axis of rotation and a cylindrical side wall extending parallel to the axis of rotation, the second bearing surface being formed in the bottom surface. In this case, it is particularly preferred if the free end of the pin is surrounded by a cylindrical carrier, which is adjustable in the axial direction of the pin, and if the sleeve is mounted rotatably on the carrier. This rotatable mounting may take place, for example, by means of rolling bearings. It is particularly preferred, furthermore, if the free end of the pin is provided with a thread, the carrier being screwed onto the free end. In this way, the position of the carrier, and consequently of the entire second shoulder element, on the free end of the pin can be set in a simple way, or it can be removed entirely from the pin.

Such a construction of the second shoulder element therefore achieves the effect that the pin is connected to the second shoulder element freely rotatably about the axis of rotation, it being possible at the same time for the axial position of the second shoulder element to be adapted.

In a preferred embodiment, a ball bearing is provided between the side wall and the free end of the pin. It is also preferably possible to provide two ball bearings, which are arranged parallel and spaced apart in the direction of the axis of rotation. The use of ball bearings offers substantially friction-free mounting, which can also absorb axial loads.

In another preferred embodiment, the carrier has a threaded bore, extending perpendicularly to the axis of rotation, for receiving a fixing screw, a bore aligned coaxially in relation to the threaded bore being provided in the side wall of the sleeve. Such a fixing screw, which is for example accessible from outside the sleeve, then allows the screwed-on carrier to be fixed in a position with respect to the axis of rotation on the free end of the pin or, after loosening of the screw, to be removed from the pin.

In yet another preferred embodiment, the pin is fixedly connected to the first shoulder element. In this case, it is particularly preferred if the pin is formed in one piece with the first shoulder element. In this way, the first shoulder rotates with the pin and rubs against the surface of the at least one workpiece, the material of the workpiece in the region adjacent the first shoulder element being plasticized.

In a preferred embodiment as an alternative to this, the pin is connected to the first shoulder element freely rotatably about the axis of rotation. In this case, it is particularly preferred if the first shoulder element has a first annular intermediate piece of ceramic material and the first intermediate piece surrounds the engaging portion. It is particularly preferred, furthermore, if the pin is connected to the first shoulder element in an axially displaceable manner. Consequently, the first shoulder element has the same construction in the essential points as the second shoulder element. With two shoulder pieces connected to the pin freely rotatably about the axis of rotation, it is possible, as described in conjunction with the second shoulder element, for the thermal and mechanical loading of the pin to be reduced still further and similarly the quality of the welded joint to be increased further.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Figure 2:
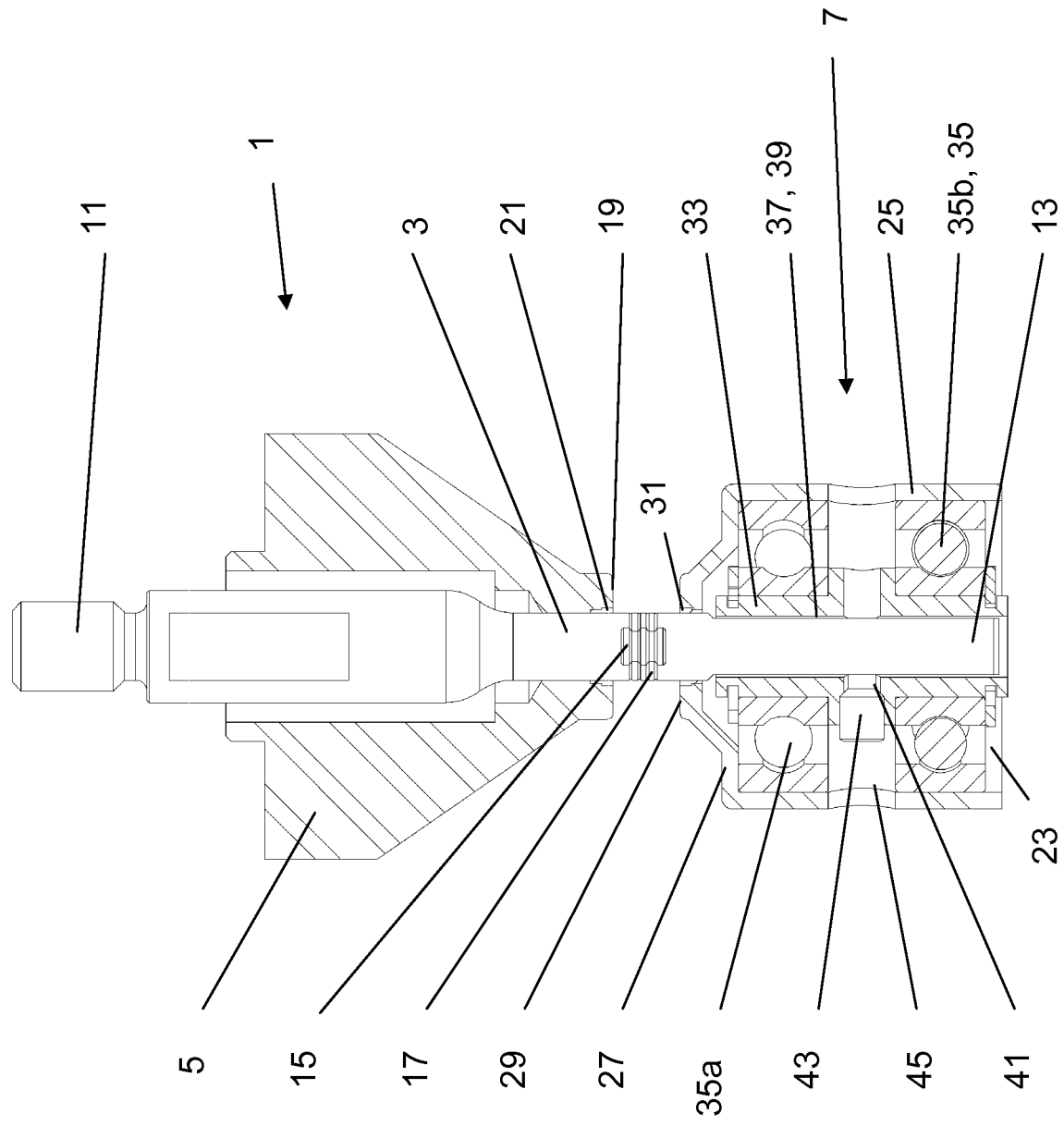

A preferred embodiment of the present invention is described in detail below with reference to the attached drawing figures, wherein:

FIG. 1 shows a side view of an exemplary embodiment of an apparatus according to the invention for friction stir welding; and FIG. 2 shows a section along the axis of rotation of the exemplary embodiment from FIG. 1.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

In FIG. 1, an exemplary embodiment of an apparatus 1 according to the invention for friction stir welding is represented. The apparatus 1 for friction stir welding has a pin 3, a first shoulder element 5 and a second shoulder element 7.

The pin 3 has a substantially cylindrical form and is driven in a rotating manner with respect to an axis of rotation 9, which coincides with the axis of symmetry of the pin 3. The pin 3 has a drive end 11 and a free end 13, opposite from the drive end 11. At the drive end 11, the rotating drive of the pin 3 takes place by means of a motor that is not represented. Between the drive end 11 and the free end 13, the pin 3 has a cylindrical engaging portion 15, which is intended for engaging with at least one workpiece in a rotating manner. In the present exemplary embodiment, the engaging portion 15 has along its circumference a structured circumferential surface 17 with an axial extent, in order to generate greater friction during the engagement with the material of one or more workpieces. As can be seen in FIG. 1, the engaging portion 15 has on its circumferential surface 17 a grooved structure.

The first shoulder element 5, arranged on the side of the engaging portion 15 that is facing the drive end 11, has in the present exemplary embodiment a substantially conical shape and is arranged concentrically around the pin 3 with respect to the axis of rotation 9, the cone tapering in the direction of the second shoulder element 7. Furthermore, the first shoulder element 5 has a first bearing surface 19, which is arranged perpendicularly to the axis of rotation 9 and is directed toward the engaging portion 15. In the present exemplary embodiment, the first shoulder element 5 is rotatably connected to the pin 3. The substantially conical shape of the first shoulder element 5 proves to be advantageous for allowing the heat produced at a workpiece from the friction during a linear movement of the first bearing surface 19 to be absorbed as well as possible and dissipated by the first bearing surface 19.

Between the first bearing surface 19 and the engaging portion 15 of the pin 3, the first shoulder element 5 has a first annular intermediate piece 21 of ceramic material (see FIG. 2). The first annular intermediate piece 21 serves for the thermal isolation of the pin 3 and the first shoulder element 5, direct contact between the pin 3 and the first shoulder element 5 being interrupted in the region of the first bearing surface 19 by the first intermediate piece 21. The first annular intermediate piece 21 is preferably produced from ceramic material, which has a low thermal conductivity. Furthermore, ceramic material has a high temperature resistance and is consequently also not destroyed by the high temperatures occurring during the operation of the apparatus.

In the present exemplary embodiment, the second shoulder element 7, arranged on the side of the engaging portion 15 that is facing the free end 13, comprises a cylindrical sleeve 23, which is arranged concentrically around the pin 3 with respect to the axis of rotation 9, with a cylindrical side wall 25, which extends parallel to the axis of rotation 9, and a bottom surface 27, which extends radially to the axis of rotation 9 and has a second bearing surface 29, facing the engaging portion 15 and extending perpendicularly to the axis of rotation 9. The second bearing surface 29 extends right up to the engaging portion 15, so that no intermediate space remains and also no further element is provided between the engaging portion 15 and the second bearing surface 29. Furthermore, the second bearing surface 29 lies opposite and substantially parallel to the first bearing surface 19, the two bearing surfaces 19, 29 bounding the engaging portion 15 in the axial direction and being able to adapt the axial extent thereof to different workpiece thicknesses. Both bearing surfaces 19, 29 are arranged concentrically around the pin 3, or around the ends of the engaging portion 15, with respect to the axis of rotation 9 and face one another, so that the shoulder elements 5, 7 are intended for bearing against opposing surfaces of one or more workpieces.

In a way similar to the first shoulder element 5, the second shoulder element 7 has in the second bearing surface 29 a second annular intermediate piece 31. The second intermediate piece 31 serves here not only as a thermal isolating element between the pin 3 and the second shoulder element 7 or the second bearing surface 29, but also as a ceramic sliding bearing for the pin 3 rotating with respect to the second shoulder element 7. Ceramic sliding bearings have a high strength and at the same time a high temperature resistance, which is a precondition for a bearing that can be used for the present invention.

As can be seen from FIG. 2, the second shoulder element 7 also comprises a substantially cylindrical carrier 33, which surrounds the free end 13 of the pin 3 concentrically with respect to the axis of rotation 9 and is connected to the side wall 25 of the sleeve 23 freely rotatably by means of ball bearings 35. In the present exemplary embodiment, two ball bearings 35a, 35b, which are arranged spaced apart from one another in the axial direction, substantially parallel to one another and perpendicularly to the axis of rotation 9 in the sleeve 23 between the side wall 25 and the carrier 33, are intended for the rotational mounting of the second shoulder element 7 on the pin 3. The carrier 33 has on its inner surface, directed toward the pin 3, an internal thread 37, and the pin 3 has at its free end 13 a corresponding external thread 39, so that the carrier 33 can be screwed onto the free end 13 of the pin 3. As a result, the pin 3 is connected to the second shoulder element 7 in an axially adjustable manner.

The carrier 33 also has a threaded bore 41, which extends perpendicularly to the axis of rotation 9 and is intended for receiving a fixing screw 43, which in the screwed-in position can butt against the pin 3 and engage with it. The engagement of the fixing screw 43 with the pin 3 serves the purpose of setting the axial position of the carrier 33 with respect to the pin 3, and consequently also the axial extent of the engaging portion 15 or the distance between the first and second bearing surfaces 19, 29. To make the fixing screw 43 accessible for setting, a bore 45 is provided in the side wall 25 coaxially in relation to the threaded bore 41.

The apparatus 1 for friction stir welding operates as follows. Firstly, two workpieces to be connected are placed against one another at those surfaces that are intended to be joined (not represented). Then, the previously described apparatus 1 for friction stir welding is moved with the engaging portion 15 along these surfaces to be joined, the pin 3 performing a rotation in relation to the first shoulder element 5 and the first and second bearing surfaces 19, 29 bearing against the surfaces of the workpiece or the workpieces.

Placed against one another means here that either two substantially flat workpieces, for example plates or sheets, are placed against one another along their end faces, i.e. generally the narrower sides, and are joined at these surfaces (butt joint). In this case, during the welding operation the axis of rotation 9 of the pin 3 runs parallel to the plane that is defined by the surfaces lying against one another.

However, it may also mean that the two workpieces overlap, i.e. parts of the surfaces are laid one over the other and then the respectively adjacent surfaces are joined (lap joint). Here, during the welding the axis of rotation 9 then runs perpendicularly to the bearing plane. The apparatus 1 may then be moved along the entire contact surface from one end of the workpieces placed against one another to the other, or introduced specifically at individual locations. The pin 3 may be introduced into the workpieces from the edge or a bore may be introduced into the region of the contact surface of the workpieces, after which the second shoulder element 7 is unscrewed from the pin 3 and the pin 3 is passed through the bore. After that, the second shoulder element is screwed again onto the pin 3 and fixed with the fixing screw 43 such that the two bearing surfaces 19, 29 bear against the respective surfaces of the workpieces or the workpiece that are opposing or facing away from one another.

The previously described freely rotatable mounting of the second shoulder element 7 at the free end 13 of the pin 3 has the effect that the second shoulder element 7, and consequently the second bearing surface 29, is not moved along by the rotation of the pin 3. The second bearing surface 29 therefore also does not rub against the workpiece or the workpieces. In this way, the thermal loading of the pin 3 and of the second shoulder element 7 is reduced in comparison with a friction stir welding tool according to the prior art with two rotating shoulders. By the same token, the mechanical loading of the pin 3 is reduced, since the pin 3 does not have to transfer any torque to the second shoulder element 7.

With such a construction, higher speeds with which the apparatus 1 or the rotating pin 3 moves along the surfaces to be joined are possible as a consequence of the aforementioned features. The higher speed of the apparatus 1 has the effect of further reducing the thermal loading on the pin 3, the second shoulder element 7 and the workpiece, since the pin 3 rotates for a shorter time in one place, i.e. rubs against the same material for a shorter time. At the same time, the thermal loading of the workpiece or the workpieces is reduced, whereby higher quality of the welded joint is achieved.

Alternatively, the first shoulder element 5 may also be fixedly mounted on the pin 3. Although this would increase the thermal and mechanical loading of the pin 3, the first shoulder element 5 and the workpiece for the reasons mentioned above, the construction in the upper part of the apparatus would be simplified.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. An apparatus for friction stir welding, said apparatus comprising:
   a pin configured to be driven in a rotating manner about an axis of rotation and including a drive end and a free end, wherein between the drive end and the free end a cylindrical engaging portion is provided, with the engaging portion extending axially in the direction of the axis of rotation, and including a circumferential surface configured for engagement with one or more workpieces;
   a first shoulder element arranged on a side of the engaging portion that is adjacent the drive end and is arranged concentrically around the pin with respect to the axis of rotation, said first shoulder element including a first bearing surface that faces the engaging portion and extends perpendicularly to the axis of rotation;
   a second shoulder element arranged on a side of the engaging portion that is adjacent the free end and is arranged concentrically around the pin with respect to the axis of rotation,
   said second shoulder element including a second bearing surface that faces the engaging portion and extends perpendicularly to the axis of rotation,
   wherein the second bearing surface extends to the engaging portion,
   wherein the first shoulder element and the second shoulder element are configured to bear against opposite, respective first and second surfaces of the one or more workpieces; and
   a bearing element rotatably interconnecting the pin and the second shoulder element so that the pin is rotatable relative to the second shoulder element about the axis of rotation, thereby permitting the second shoulder element to remain stationary with respect to the surface of the at least one workpiece while the pin rotates,
   wherein the second shoulder element is formed as a sleeve with a bottom surface extending radially to the axis of rotation and a cylindrical side wall extending parallel to the axis of rotation, the second bearing surface being formed in the bottom surface,
   wherein the free end of the pin is surrounded by a cylindrical carrier, which is adjustable in the axial direction of the pin, and wherein the sleeve is mounted on the carrier so as to permit relative rotation therebetween,
   wherein the bearing element includes a ball bearing provided between the side wall and the free end of the pin,
   wherein the free end of the pin is provided with a thread, and the carrier is configured to be screwed onto the free end, so that the pin is connected to the second shoulder element in an axially adjustable manner,
   wherein the carrier has a threaded bore extending perpendicularly to the axis of rotation for receiving a fixing screw, and a bore aligned coaxially in relation to the threaded bore is formed in the side wall of the sleeve.

2. The apparatus as claimed in claim 1,
   wherein the second shoulder element includes an annular intermediate piece of ceramic material provided in the second bearing surface,
   wherein the intermediate piece surrounds the engaging portion.

3. The apparatus as claimed in claim 1
   wherein the pin is fixedly connected to the first shoulder element.

4. The apparatus as claimed in claim 3,
   wherein the pin is formed in one piece with the first shoulder element.

5. The apparatus as claimed in claim 1,
   wherein the pin is connected to the first shoulder element so as to be freely rotatable relative thereto about the axis of rotation.

6. The apparatus as claimed in claim 5,
   wherein the first shoulder element includes an annular intermediate piece of ceramic material,
   wherein the intermediate piece surrounds the engaging portion.

7. The apparatus as claimed in claim 5,
   wherein the pin is connected to the first shoulder element in an axially displaceable manner.

* * * * *